United States Patent [19]

Bond et al.

[11] 4,056,946

[45] Nov. 8, 1977

[54] LOW TEMPERATURE COOLER/CONDENSER

[75] Inventors: James A. Bond, West Chester; Spurgeon E. Eckard; Arthur W. Schnacke, both of Cincinnati, all of Ohio

[73] Assignee: General Electric Company, Fairfield, Conn.

[21] Appl. No.: 632,109

[22] Filed: Nov. 14, 1975

[51] Int. Cl.² .................................................. F28D 5/00
[52] U.S. Cl. ........................................... 62/121; 62/305; 261/140 R; 261/152
[58] Field of Search ................. 62/305, 121; 165/110; 261/98, 140 R, 152, 128

[56] References Cited

U.S. PATENT DOCUMENTS

| 761,448 | 5/1904 | Cole et al. | 62/305 |
| 2,655,795 | 10/1953 | Dyer | 62/305 X |
| 3,427,005 | 2/1969 | Kuykendall | 62/305 X |
| 3,864,442 | 2/1975 | Percy | 62/305 X |

Primary Examiner—Alan Cohan
Assistant Examiner—Gerald A. Michalsky
Attorney, Agent, or Firm—Raymond H. Quist; Allen E. Amgott

[57] ABSTRACT

A bed of beads is placed in the path of the air flowing to the tubing of the condenser. Water is sprayed on the bed so that it will be evaporated and so cool the air below the dry bulb temperature.

7 Claims, 1 Drawing Figure

U.S. Patent   Nov. 8, 1977   4,056,946
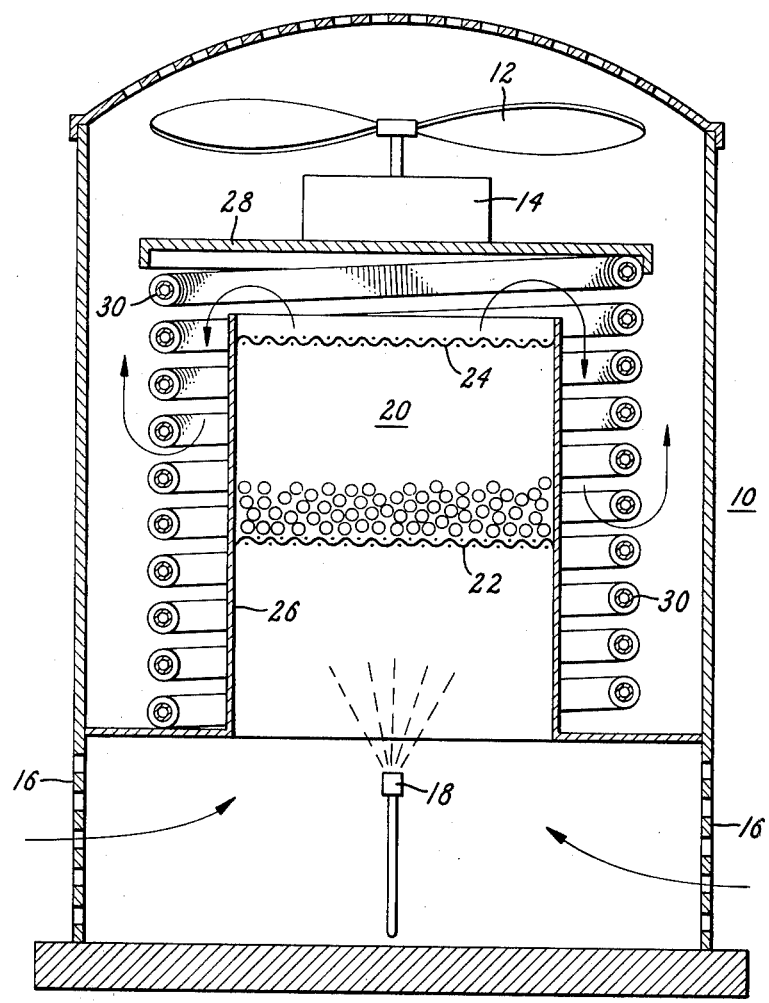

LOW TEMPERATURE COOLER/CONDENSER

BACKGROUND OF THE INVENTION

This invention relates to condensers for air conditioning or other refrigeration systems.

In an air cooled condenser the temperature to which the condensed refrigerant can be cooled is, in the limit, the dry bulb temperature of the air. As a result, as the ambient temperature rises the condensing temperature increases, thus reducing the system efficiency. An improvement can be achieved, however, if the air temperature can be lowered prior to passing it over the coils of the condenser. There are prior art disclosures of this technique.

In U.S. Pat. No. 2,655,795 an evaporative pad composed of fibrous material such as excelsior is placed in the incoming air stream. Water trickles down through the pad and is evaporated by the air passing through it, lowering the temperature of the air.

In U.S. Pat. No. 3,427,005 an inclined pad is used in much the same manner. The pad in this case is aspenwood.

In both of these prior art approaches it will be recognized that mineral deposits will eventually clog the pad decreasing its effectiveness.

SUMMARY OF THE INVENTION

The structure of a cooler/condenser is modified by adding a bed of beads together with means for applying water to the beads. The bed is positioned so that incoming air will pass through it and be cooled by giving up the heat of vaporization of the water, prior to passing over the tubes containing the fluid to be cooled or condensed.

BRIEF DESCRIPTION OF THE DRAWING

The drawing is a schematic, cross-section of a cooler/condenser in accordance with the invention.

DESCRIPTION OF THE PREFERRED EMBODIMENT

Referring to the drawing, air cooled condenser 10 is illustrated. Under the influence of fan 12 which is driven by motor 14, air is drawn into the condenser at its base through grill 16. Spray nozzle 18 sprays water into the path of the incoming air. The water laden air rises up and through bed 20. Bed 20 in accordance with the invention is composed of beads which are contained by lower and upper screens 22 and 24 respectively together with wall 26. Although screens are shown in the drawing other forms of foraminated walls may be employed. Barrier 28 redirects the air downwardly so that it passes through tube coil 30 before again rising and passing out of condenser 10.

In passing through bed 20 water is deposited upon the beads and evaporates therefrom causing a temperature reduction in the air. Obviously, the limit to which the temperature can be reduced is the wet bulb temperature.

Nozzle 18 may be supplied with water from any suitable source such as the household water system, preferably without requiring any additional pump to increase pressure. Because of entrained materials within the water, eventually deposits will form on the beads in bed 20. To reduce the increased pressure drop across bed 20 which thereby results, periodically the spray from nozzle 18 is turned off and the beads in bed 20 are allowed to dry. In the dry condition the air flow through bed 20 causes the beads to tumble or become fluidized. This bouncing and rubbing of the beads against each other causes the mineral deposits to break loose and be blown from bed 20. The water spray can then be resumed.

The beads in bed 20 are not critical from the standpoint of size or material. Glass beads nominally $3.2 \times 10^{-3}$ meters in diameter may be used, although other materials and sizes may be employed.

Tube coil 30 is preferably of the finned type.

It should be noted that even with the water turned off, the condenser will continue to operate, but at reduced effectiveness. Also, when the dry bulb temperature is low enough to do the requisite cooling, the water may be turned off.

Although a specific embodiment of a cooler/condenser has been illustrated and described, it will be obvious that changes and modifications can be made without departing from the spirit of the invention and the scope of the appended claims.

We claim:

1. In a condenser having tubing for carrying fluid to be condensed and cooled and a fan for moving ambient air over said tubing, the improvement comprising:
   a horizontal bed of beads positioned in the path of the air flowing to said tubing; and
   means for applying water to said bed of beads whereby water vapor will be entrained in said air.
2. A condenser in accordance with claim 1 wherein: said bed of beads is maintained in place by upper and lower foraminated walls.
3. A condenser in accordance with claim 1 wherein: said means for applying water to said bed of beads includes spray nozzle.
4. A condenser in accordance with claim 1 wherein: said tubing is finned.
5. A condenser in accordance with claim 1 wherein: said tubing is contained in an annular cavity formed by spaced inner and outer walls of said condenser and said bed of beads is located in the cylindrical passage formed by said inner walls.
6. A condenser in accordance with claim 5 further including:
   baffle means located above said cylindrical passage for directing air flow into said annular cavity.
7. A method of cooling fluid contained in the tubing of a condenser comprising:
   applying water to a bed of beads;
   passing air first through said bed of beads and then over said tubing; and
   periodically terminating the application of water to said bed of beads long enough to dry said beads and fluidize said bed.

* * * * *